US008672571B2

(12) United States Patent
Monzo et al.

(10) Patent No.: US 8,672,571 B2
(45) Date of Patent: Mar. 18, 2014

(54) ILLUMINATED MARKING DEVICE AND APPARATUS

(75) Inventors: Anthony P. Monzo, Easton, PA (US); Scott Collins, Nazareth, PA (US); Gregory R. Nungester, Asbury, NJ (US)

(73) Assignee: Crayola LLC, Easton, PA (US)

( * ) Notice: Subject to any disclaimer, the term of this patent is extended or adjusted under 35 U.S.C. 154(b) by 755 days.

(21) Appl. No.: 12/897,091

(22) Filed: Oct. 4, 2010

(65) Prior Publication Data

US 2011/0081191 A1    Apr. 7, 2011

Related U.S. Application Data

(60) Provisional application No. 61/248,574, filed on Oct. 5, 2009.

(51) Int. Cl.
*B43K 29/00* (2006.01)

(52) U.S. Cl.
USPC .............................. 401/195; 401/131; 434/81

(58) Field of Classification Search
USPC ................ 401/131, 195; 446/146; 434/81, 84
See application file for complete search history.

(56) References Cited

U.S. PATENT DOCUMENTS

| | | | | |
|---|---|---|---|---|
| 4,155,446 A | * | 5/1979 | Aronson | 401/131 |
| 5,360,342 A | * | 11/1994 | Pardner | 434/84 |
| 5,658,002 A | * | 8/1997 | Szot | 401/195 |
| 5,673,996 A | * | 10/1997 | Ducker | 401/195 |
| 6,124,377 A | * | 9/2000 | Kaiser et al. | 523/161 |
| 6,238,057 B1 | * | 5/2001 | Chen | 362/118 |
| 6,428,179 B1 | * | 8/2002 | Saffron et al. | 401/195 |
| 6,830,403 B2 | * | 12/2004 | Tsai | 401/195 |
| 7,160,045 B2 | * | 1/2007 | Oas | 401/195 |
| 2002/0115375 A1 | * | 8/2002 | Koizumi | 446/146 |
| 2002/0172542 A1 | * | 11/2002 | Nadel | 401/195 |
| 2004/0076460 A1 | * | 4/2004 | Yu et al. | 401/1 |
| 2004/0161287 A1 | * | 8/2004 | Yu | 401/195 |
| 2007/0054590 A1 | | 3/2007 | Schmidt et al. | |
| 2007/0054594 A1 | | 3/2007 | Schmidt et al. | |
| 2007/0060013 A1 | | 3/2007 | Schmidt et al. | |
| 2007/0128972 A1 | | 6/2007 | Schmidt et al. | |
| 2007/0190893 A1 | * | 8/2007 | Nakashima | 446/146 |
| 2007/0245926 A1 | * | 10/2007 | Li et al. | 106/31.27 |

* cited by examiner

*Primary Examiner* — David Walczak
*Assistant Examiner* — Bradley Oliver
(74) *Attorney, Agent, or Firm* — Shook, Hardy & Bacon L.L.P.

(57) ABSTRACT

An illuminated marking device is described for use with colorless marking materials. The marking materials remain colorless until being transferred to a marking surface having a developer material disposed thereon that causes the marking material to develop a colored appearance. The marking material is contained within a marking device having a clear or translucent barrel and a lens integrated into a first end. The lens is tinted in a color similar to that of the developed color of the marking material. The first end of the marker is inserted into a light housing having a light source therein. Light from the light source is filtered by the lens and thereby illuminates the barrel of the marker in a color similar to that of the developed color of the marker. The glowing marker indicates the marking color of the marker and provides an enjoyable glowing experience.

17 Claims, 5 Drawing Sheets

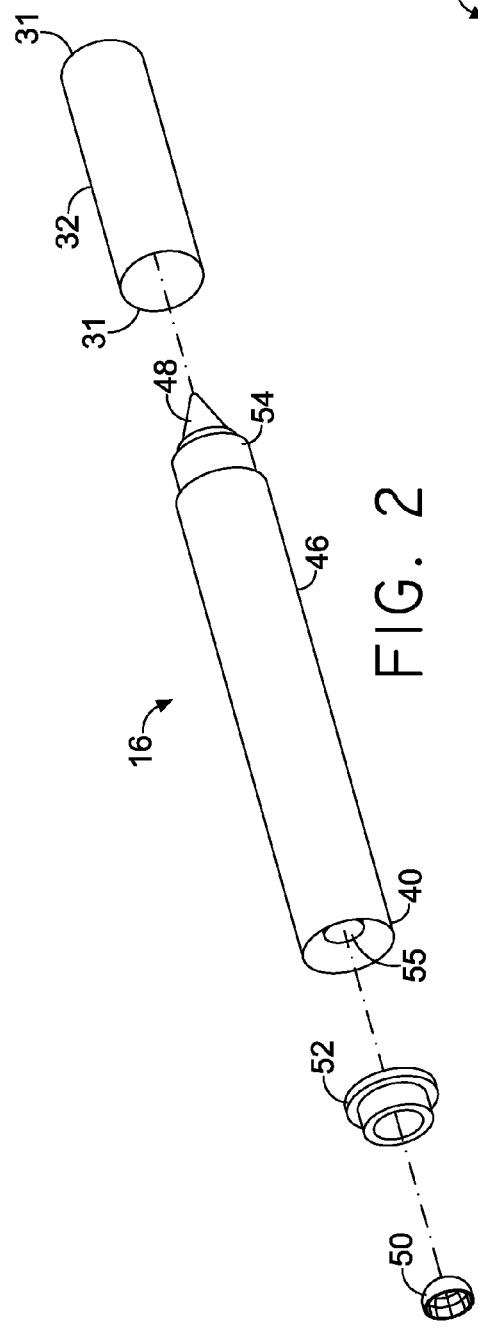
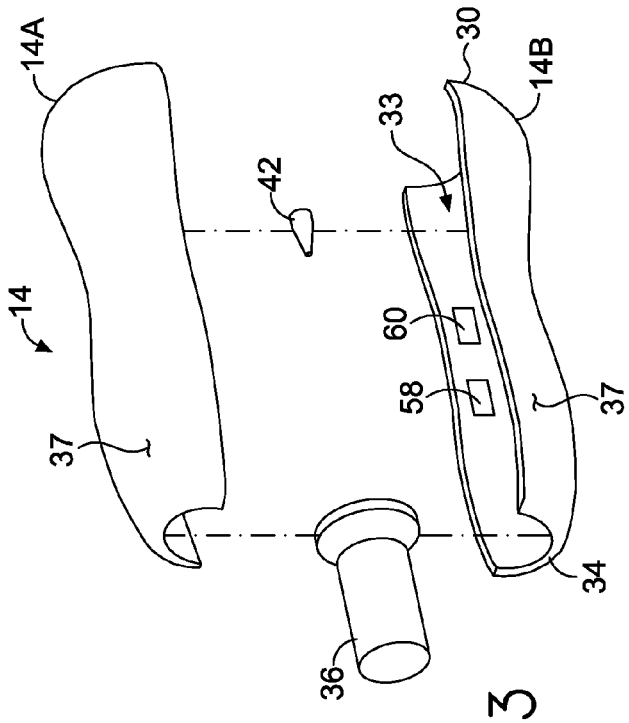

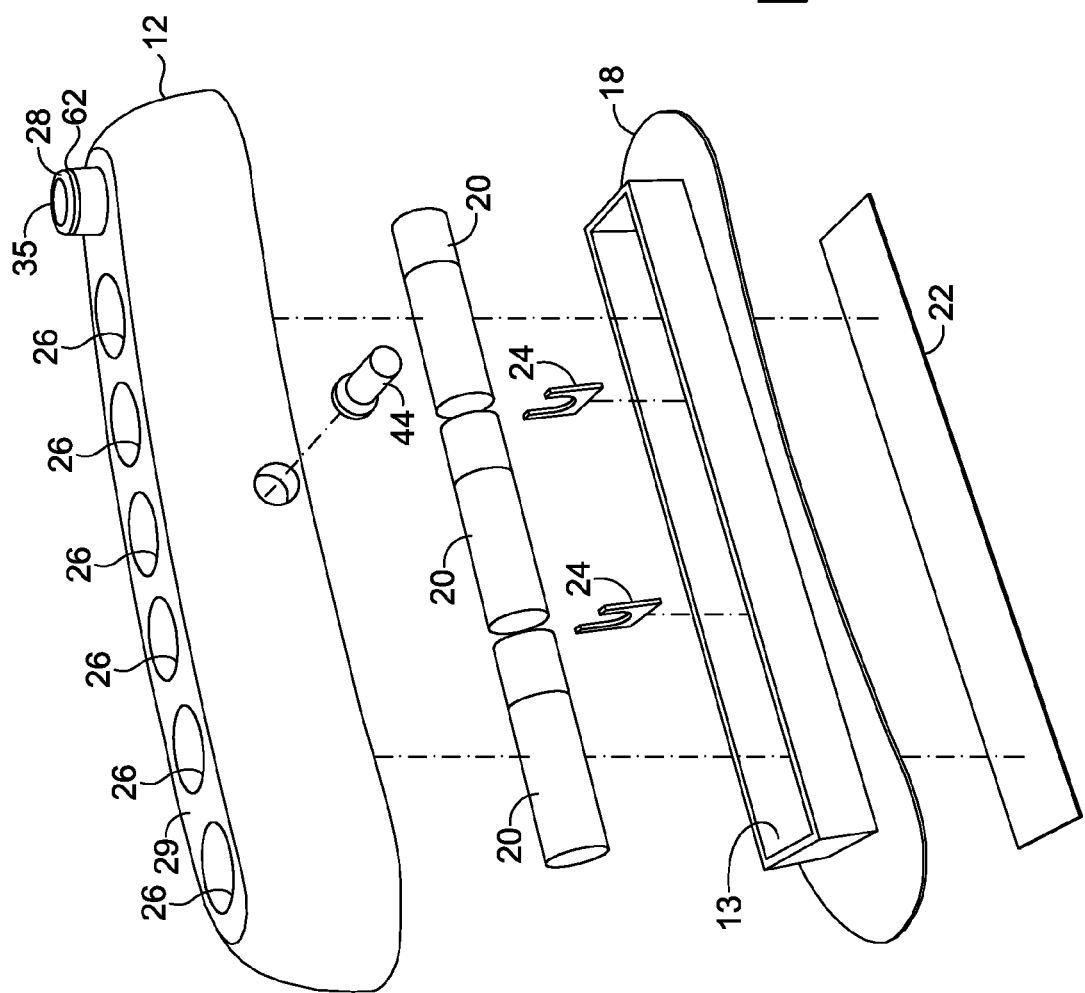

ILLUMINATED MARKING DEVICE AND APPARATUS

CROSS-REFERENCE TO RELATED APPLICATIONS

This non-provisional patent application claims priority to Provisional Patent Application Ser. No. 61/248,574, filed Oct. 5, 2009 which is hereby incorporated herein in its entirety by reference.

BACKGROUND

It is well known that drawing, writing, and creating artwork are significant activities in the learning and development processes of children. The writing or drawing implements used by children when partaking in these activities are often messy and may result in stains to clothing and other unintended surfaces. For example, markers, pens, pencils, and paints often leave permanent marks or stains on any surface with which they come into contact. Various implements and substances have been developed to reduce the risk of stains while also providing an easily useable product that produces vivid colors in the final artwork.

SUMMARY

Embodiments of the invention generally relate to an illuminated marking device that includes a generally clear or translucent barrel in which a generally clear or translucent, colorless marking material is disposed. The marking material is configured to remain colorless until contacting a surface with a developer material disposed thereon. Upon interacting with the developer material the colorless marking material takes on a designated color. A lens is located at a non-marking end of the barrel of the illuminated marking device and is colored similarly to the color that the marking material takes on when developed. The marking device is removeably connected to a light housing having a light source disposed therein.

When illuminated, light is directed through the lens and into the barrel. The light from the light source is filtered by the lens such that only light of the color of the lens passes into the barrel. The light illuminates the barrel in the color of the lens and the developed color of the marking material. As such, a pleasing, colored, glowing effect is imparted to the barrel to identify to a user the color that the marking material within the barrel will take on when developed and to provide an enjoyable drawing experience.

This Summary was provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

DESCRIPTION OF THE DRAWINGS

Illustrative embodiments of the invention are described in detail below with reference to the attached drawing figures, wherein:

FIG. 2 is an exploded view depicting an illuminated marking device in accordance with an embodiment of the invention;

FIG. 3 is an exploded view depicting a light housing of an illuminated marking device in accordance with an embodiment of the invention;

FIG. 4 is an exploded view depicting a base for an illuminated marking device in accordance with an embodiment of the invention;

DETAILED DESCRIPTION

Figure 1:
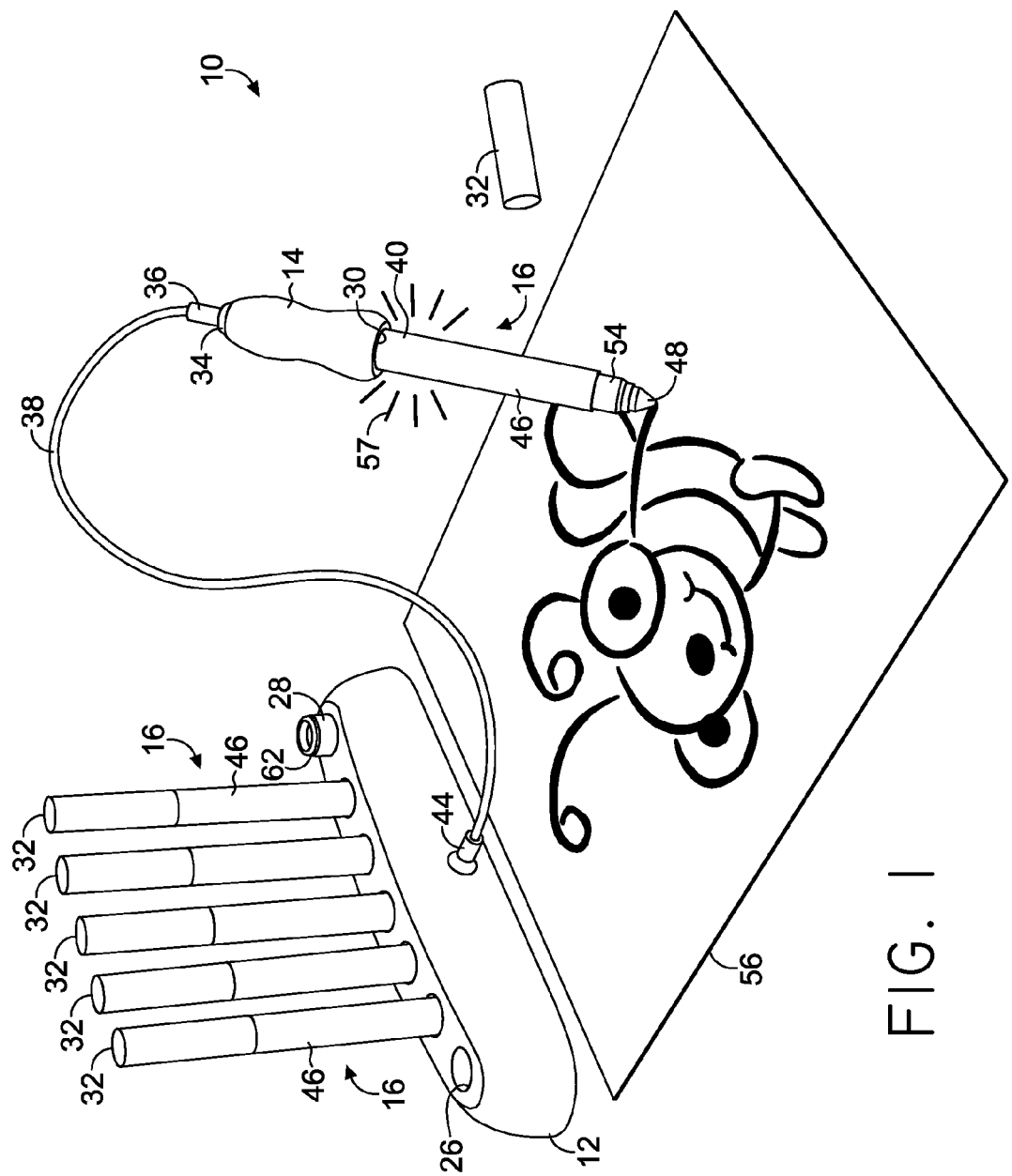
FIG. 1 is a perspective view depicting an illuminated marking device and apparatus in accordance with an embodiment of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different components, or combinations of components similar to the ones described in this document, in conjunction with other present or future technologies.

Embodiments of the invention employ a colorless, generally clear ink that when placed in contact with a marking surface treated with a developer material, is developed to take on a colored appearance. Such inks and developer materials are described in U.S. Pat. No. 6,124,377 to Kaiser et al., U.S. patent application Ser. No. 11/406,906 to Li et al, and U.S. patent application Ser. No. 11/498,469 to Li et al., each of which is hereby incorporated by reference in its entirety herein. In an embodiment, the inks are Color Wonder™ inks from Crayola® LLC of Easton, Pa. As such, the marking materials described herein are colorless until being transferred to a marking surface and developed thereon. The color that the marking materials take on when developed is referred to herein as a developed color. In another embodiment, any clear ink or marking material that takes on a color when transferred to a marking surface is useable in embodiments of the invention. Alternatively, any ink technology including those that are colored, water-based, alcohol-based, and the like may be utilized in embodiments of the invention.

Embodiments of the invention include devices, apparatus, and kits. In an embodiment, an illuminated marking device is described. The illuminated marking device includes a marker with a transparent or translucent barrel, a colorless marking material stored within the barrel, a marking tip at a first end of the marker, and an endpiece at a second end of the marker. The endpiece includes a lens that is tinted in a color similar to a developed color of the marking material. The illuminated marking device also includes a light housing in electrical communication with a power source. The light housing also includes a light source and an aperture configured to removeably couple to the second end of the marker. The second end of the marker is removeably coupled to the aperture of the light housing and, light from the light source is filtered by the lens to illuminate the barrel of the marker in the color similar to the developed color of the marking material.

In another embodiment, an apparatus for illuminating a marking device is described. The apparatus includes a marker with a transparent or translucent barrel, a colorless marking material housed within the barrel, a marking tip at a first end, and an endpiece at a second end. The endpiece includes a lens that is tinted in a color similar to a developed color of the marking material. A light housing is also provided in the apparatus and includes a light source and an aperture configured to removeably couple to the second end of the marker. The apparatus further includes a base that has a plurality of apertures configured to accept an equal plurality of the marker, a retaining rod configured to removeably couple with the light housing, and a power source. A wire is coupled between the power source in the base and the light source in the light housing. The second end of the marker is removeably coupled to the aperture of the light housing and, light from the light source is filtered by the lens to illuminate the barrel of the marker in the color similar to the developed color of the marking material.

In another embodiment, a kit for creating artwork with an illuminated marking device is provided. The kit includes markers with a transparent or translucent barrel, a colorless marking material housed within the barrel, a marking tip at a first end of the marker, a cap configured to removeably couple to the first end of the marker, and an endpiece at a second end of the marker. The endpiece includes a lens that is tinted in a color similar to a developed color of the marking material and, the marking material in each of the markers provides a different developed color. The kit also includes a light housing with a light source, an aperture configured to removeably couple to the second end of the marker, and a switch configured to trigger illumination of the light source. A timer is also provided that automatically turns off the light source after a pre-determined duration of continuous illumination of the light source. The kit further includes a base with apertures configured to accept the markers, a retaining rod configured to removeably couple with the light housing, and a power source. An electrical cord is coupled between the power source in the base and the light source in the light housing. Additionally, the kit includes a marking surface having a developer material disposed thereon that develops the colorless marking material to provide a colored appearance when the colorless marking material is transferred to the marking surface. The second end of the marker is removeably coupled in the aperture of the light housing. Light from the light source is filtered by the lens and illuminates the barrel of the marker in the color similar to the developed color of the marking material.

Referring now to FIGS. 1-7C, an illuminated marking device 10 is described in accordance with an embodiment of the invention. The illuminated marking device 10 includes a base 12, a light housing 14, and a marker 16. Each of the components of the illuminated marking device 10 is constructed or manufactured using known processes and methods. For example, one or more components might be produced using injection molding or extrusion of materials. The components are assembled using glues, adhesives, fasteners, welding, and snap-fit configurations, among a variety of other joining techniques. Further, the components of the illuminated marking device 10 are constructed from materials known in the art such as, for example and not limitation, plastics, rubbers, and metals.

The base 12 includes a bottom panel 18 that forms a bottom surface of the base 12 and a battery compartment 13. The base 12 also houses a power source, such as a number of dry-cell batteries 20 that are retained within the battery compartment 13 by a battery compartment door 22 and two stanchions 24 mounted within the battery compartment 13. In an embodiment, an alternative or additional power source is employed such as, for example, a connection to an alternating current or direct current circuit, a generator, a solar array, or other source of electrical power known in the art. In such an embodiment, components for accommodating the batteries 20, such as the battery compartment 13 and battery compartment door 22 are omitted.

In another embodiment, the base 12 includes a slot (not shown) extending along a length thereof for accepting and removeably coupling to a marking surface 56. One or more features such as clips, tabs, and frictional surfaces are included within the slot to aid in retaining the coupling to the marking surface.

The base 12 also includes a number of apertures 26 and a retaining pole 28 along an upper surface 29. The apertures 26 provide circular recessed hollows in the upper surface 29 of the base 12 and are configured to accept a portion of the markers 16 therein. The apertures 26 have an interior diameter of suitable dimension to accept a portion of the marker 16 in a press-fit configuration such that the marker 16 is releasably retained by the aperture. The apertures 26 also have a depth sufficient to accept a marker 16 a sufficient distance to support and retain the marker in a generally vertical orientation. In another embodiment, the apertures 26 are provided at an angle such that the marker 16 inserted therein is supported in a non-vertical orientation, such as at a 45 degree angle. Further, the apertures 26 may have any cross-sectional shape, configuration, or arrangement on the base 12 that is compatible with the cross-sectional shape or configuration of the markers 16.

Figure 5:
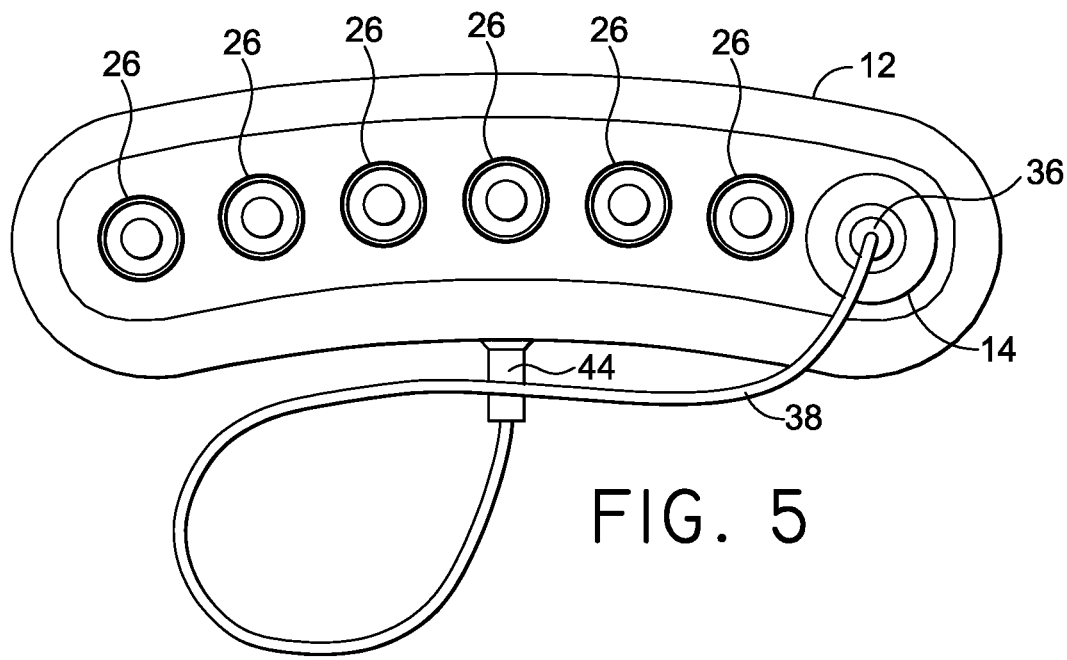
FIG. 5 is a top plan view depicting an illuminated marking device apparatus in accordance with an embodiment of the invention.
Figure 6:
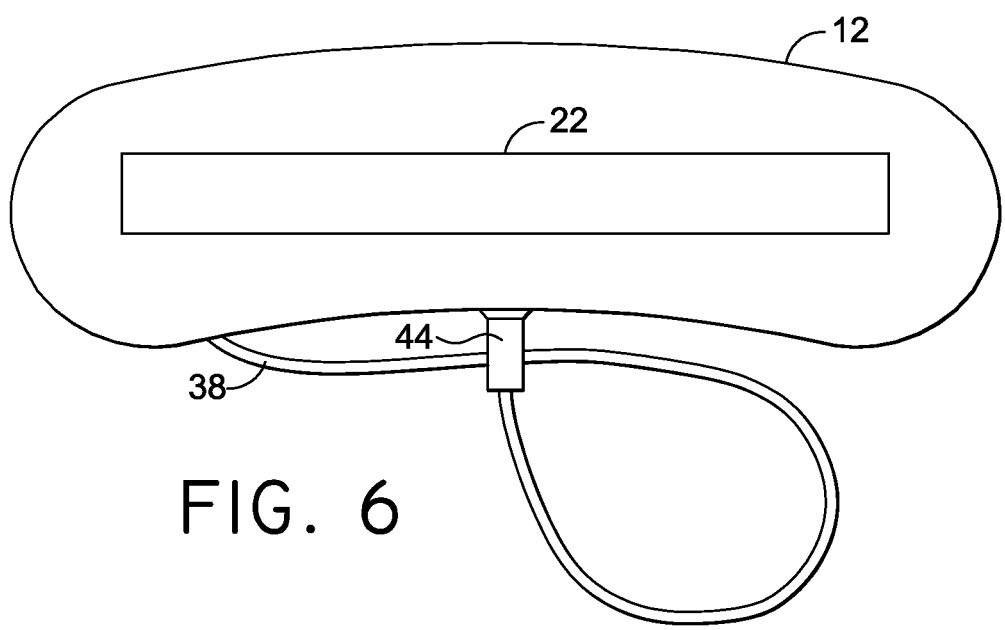
FIG. 6 is a bottom plan view depicting an illuminated marking device apparatus in accordance with an embodiment of the invention.
Figure 7C:
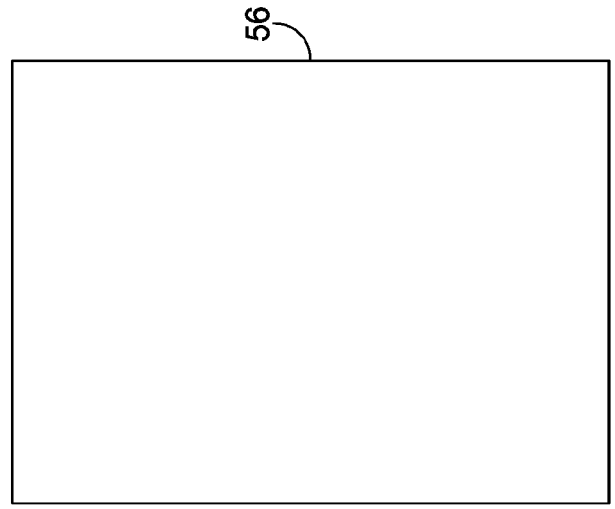
FIG. 7C is a top plan view depicting a marking surface for use with an illuminated marking device in accordance with an embodiment of the invention.
Figure 7A:
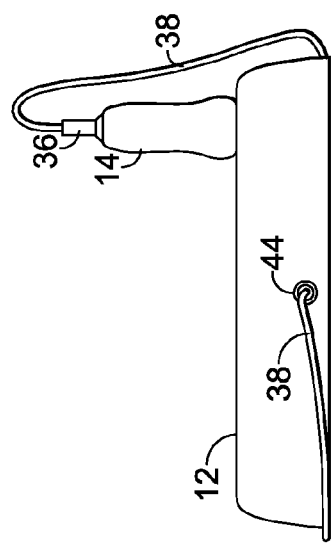
FIG. 7A is front elevational view of a illuminated marking device base in accordance with an embodiment of the invention.
Figure 7B:
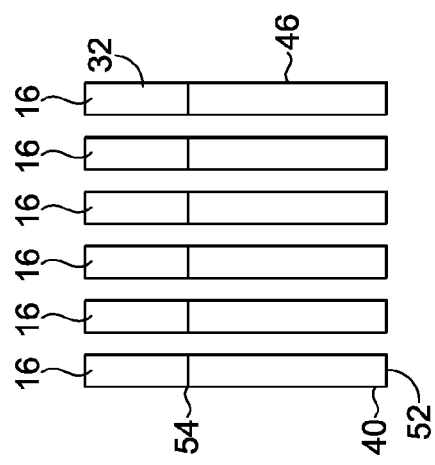
FIG. 7B is an elevational side view depicting six marking devices useable with the illuminated marking device base of FIG. 7A in accordance with an embodiment of the invention.

The retaining pole 28 is a cylindrical protuberance from the upper surface 29 of the base 12 having an end 35 distal to the base 12 that is configured to removeably couple with a corresponding first end 30 of the light housing 14 and with each of a pair of opposing ends 31 of a cap 32 of the marker 16. The retaining pole 28 has an outer diameter smaller than an interior diameter of the first end 30 of the light housing 14. This configuration enables the light housing 14 to accept at least a portion of the retaining pole 28 within an interior 33 of the light housing 14 and enables the light housing 14 to rest thereon in a storage position, as depicted in FIGS. 5 and 7A. The retaining pole 28 may provide one or more features 62 at the distal end 35 thereof, such as ribs, threads, protuberances, or other features to provide a mechanical interaction with the light housing 14 and the cap 32 to aid in retention of the connection therebetween, such as for example by snap-fit.

The light housing 14 includes a pair of components 14a and 14b that are fixedly coupled to form the light housing 14. The components 14a and 14b are coupled by any methods available in the art such as, for example and not limitation, adhesives, welding, or fasteners. The light housing 14 is a hollow, generally cylindrical body having the first end 30 and a second end 34. An exterior surface 37 of the light housing 14 has any desirable form. In an embodiment, the exterior surface 37 is configured to be easily graspable by a child's hand. A fitting 36 is fixedly coupled to the second end 34 of the light housing 14 for supporting a wire 38 extending from the light housing 14. The first end 30 of the light housing 14 includes an aperture configured to accept a first end 40 of the marker 16 or the distal end 35 of the retaining pole 28, as described above. The first end 30 includes one or more features (not shown) within the aperture such as, for example and not limitation, ribs, threads, protuberances, and gaskets, among others to form a removable mechanical or frictional coupling to the first end 40 of the marker 16. In another embodiment, a power source, such as one or more dry cell batteries, is disposed within the light housing instead of within the base 12.

A light source 42 is disposed within the interior 33 of the light housing 14. The light source 42 includes any available light source such as, for example and not limitation, a light emitting diode (LED), halogen, incandescent light, or the like. In an embodiment, the light source 42 may illuminate a portion of the light housing 14 when illuminated to indicate to a user that light source is on.

The wire 38 electrically couples the light source 42 to the battery 20 power source housed within the base 12 and connects the light housing 14 to the base 12. The wire 38 includes any wire or electrical cord suitable for supplying electrical power from the batteries 20 to the light source 42. The wire 38 may be coated or sheathed in any desired materials and is configured to withstand periodic bending, flexing, and tensioning as might be encountered during use of the illuminated marking device 10. The wire 38 is also supported at one end by the fitting 36 coupled to the light housing 14 and at an opposite end by a fitting 44 coupled to the base 12 to avoid damage to the wire 38 due to rubbing of the wire 38 with the base 12 or the light housing 14 as well as damage due to sharp bending of the wire 38 at either end. The fittings 36 and 44 are formed from a pliable, flexible rubber or other material and are affixed to the base 12 and light housing 14 in any desired manner.

In an embodiment, the light housing 14 includes one or more switches or sensors 58 located within the interior 33 that are triggered when the marker 16 is inserted therein. The switch 58 controls the illumination of the light source 42. Thereby, the light source 42 is illuminated when the marker 16 is inserted into the light housing 14 and is turned off when the marker 16 is removed. The switch(es) 58 may also act to couple to the marker 16 and removeably retain the marker 16 within the light housing 14. An automatic shutoff timer or circuitry 60 may be provided to automatically turn the light source 42 off when the marker 16 has remained within the light housing 14 for a pre-determined length of time. Such aids in preventing rundown of the batteries 20 during periods of non-use of the illuminated marking device 10. A manual switch (not shown) may also be included on the light housing 14 or on the base 12 to allow a user to control illumination of the light source 42.

The marker 16 includes a barrel 46, a marking tip 48, the cap 32, a lens 50, and an endpiece 52. The marker 16 is generally configured to resemble a felt tip marker as is known in the art with the exception of the novel differences described below. In embodiments of the invention, the marker 16 is configured to resemble various other marking devices known in the art with the novel differences described below incorporated therein.

The barrel 46 is an open-ended hollow cylinder having the first end 40 and a second end 54. The barrel 46 is constructed from any available materials, such as a plastic, that provides a generally clear or translucent appearance to the barrel 46. The second end 54 of the barrel includes the marking tip 48. The marking tip 48 comprises a felt tip as is known in the art for use on felt tip markers, but may alternatively comprise any known marking tip technology for markers, pens, pencils, paint pens, and the like. The marking tip 48 may also include a fixture (not shown) for retaining the felt tip and coupling to the barrel 46, or the second end 54 of the barrel 46 may be configured to provide such a structure. The barrel 46 further houses a reservoir 55 of a colorless, generally clear or translucent marking material and any other components necessary for delivery of the marking material to the marking tip 48.

The cap 32 is configured to removeably couple to the first end 40 of the barrel 46. The cap 32 is a hollow cylinder having a partition within the interior of the cylinder such that, when coupled to the second end 54 of the barrel 46 the marking tip 48 is enclosed within a generally airtight cavity. As such, when the cap 32 is coupled to the second end 54 of the barrel 46 the marking material in the marker 16 and at the marking tip 48 does not readily evaporate or dry during periods of nonuse. The cap 32 and the second end 54 of the barrel 46 include one or more ribs, threads, protuberances, or other features to aid in retaining the coupling of the cap 32 to the marker 16 such as by snap-fit. The cap 32 is preferably produced from a plastic material having a color that resembles a developed color of the marking material contained within the marker 16, but may be produced from any available materials and in any color(s) or appearance.

The lens 50 and endpiece 52 are coupled to the first end 40 of the barrel 46. The lens 50 is configured to fit within a recess or aperture in the endpiece 52 and is retained therein by any available means known in the art such as, for example and not limitation, snap-fit, glues or adhesives, by forming the endpiece 52 around a portion of the lens 50 to retain the endpiece 52 mechanically, or by mechanical interaction with the first end 40 of the barrel 46 when the endpiece 52 is coupled to the barrel 46. The lens 50 comprises a transparent or nearly transparent material having a color or tint imparted thereto such that the lens 50 has a color similar to or the same as the developed color of the marking material contained within a respective marker 16. In an embodiment, the lens 50 is colored or tinted in a color different from the developed color of the marking material. The lens 50 is a cupped or domed plug or section of material of sufficient thickness to provide sufficient light filtering of the light emitted by the light source 42 as described below. In an embodiment, the cupped or domed configuration of the lens 50 is of sufficient dimensions to accept an LED light source 42 at least partially within a cavity formed by the cupped configuration when the marker 16 is coupled to the light housing 14. In another embodiment, the lens 50 is a flat disc or a generally cylindrical or conical plug that is inserted into or is integral with the endpiece 52.

The endpiece 52 has a generally cylindrical form with a diameter generally equal to that of the barrel 46. The endpiece 52 is fixedly coupled to the first end 40 of the barrel 46 to retain the marking material within the barrel 46 and to retain the lens 50 at the first end 40 of the barrel 46. The endpiece 52 is preferably comprised of a clear or translucent plastic material. Alternatively, the endpiece 52 has a color similar to or the same as the developed color of the marking material contained within the marker 16, but may be made of any available material and with any aesthetic appearance. The endpiece 52 includes an aperture (not shown) extending along a central axis such that the lens 50 is exposed to each side of the endpiece 52. In an embodiment, the lens 50 is fully encompassed within the endpiece 52. Further, the endpiece 52 is configured to removeably couple with the light housing 14 as is depicted in FIG. 1. One or more ribs, threads, protuberances, or other features are included around the diameter of the endpiece 52 to provide mechanical and/or frictional coupling to the first end 30 of the light housing 14.

With continued reference to FIGS. 1-7C, the operation of the illuminated marking device 10 is described. Initially, a user selects a marking surface 56 such as, for example, a section of pre-treated paper having a developer material disposed thereon or impregnated therein. A marker 16 is also selected from a group of markers 16 that may be stored in the apertures 26 of the base 12. The marker 16 is chosen based on the developed color that will be produced when the marking material stored therein is transferred to the marking surface 56. The developed color of each of the markers 16 is indicated by the corresponding color of the cap 32 and endpiece 52 of the marker 16. In an embodiment, the developed color is not indicated to the user in order to provide an exciting mystery color experience in which the user only becomes aware of the developed color of a particular marker 16 after marking on the marking surface 56.

The light housing 14 is removed from its storage position on the retaining pole 28 as depicted in FIGS. 5 and 7A. The first end 40 of the marker 16 is inserted into the first end 30 of the light housing 14 and is removeably engaged thereby. The cap 32 is removed from the second end 54 of the marker to expose the marking tip 48 and to allow the user to begin marking on the marking surface 56. The cap 32 may be placed on the retaining pole 28 for storage during use of the marker 16.

The light source 42 within the light housing 14 is illuminated as depicted at 57 in FIG. 1. The light emitted by the light source 42 is directed through the lens 50 contained in the endpiece 52 at the first end 40 of the marker 16. As described previously, the lens 50 is tinted in the same or similar color to the developed color of the marking material in the marker 16. The lens 50 filters the light from the light source such that the light passing through the lens 50 appears to have the same or similar color as the developed color of the marking material. The filtered light illuminates the barrel 46 giving it a glowing appearance of a color similar to the developed color of the marking material. As such, the generally clear or translucent barrel 46 appears to glow in the developed color of the marking material.

The illuminated marker 16 may then be used to draw or mark on the marking surface 56, however the developed color of the marking material or the ability of the marker 10 to mark on the marking surface 56 is not affected by the illumination of the marker 16. Additionally, the ambient lighting of the space in which the illuminated marking device 10 is employed may be dimmed to increase the enjoyment of the glowing effect of the marker 16. Further, the marker 16 is removable from the light housing 14 and replaceable with a marker 16 of a different color. As such, the replacement marker 16 will be illuminated in a color corresponding to its developed color and will provide markings in its developed color different from the previous marker 16.

The light source 42 remains illuminated until the marker 16 is removed from the light housing 14, thereby disengaging a switch or sensor within the light housing 14. Alternatively, the light source 42 may be automatically turned off by a timer upon reaching a pre-determined length of time to avoid unintended rundown of the batteries 20 during periods of nonuse. In another embodiment, the light source 42 is turned off manually by triggering a switch on the base 12 or on the light housing 14.

It is to be understood that there are various additional ways of illuminating a generally clear or translucent barrel to mimic the developed color of ink contained therein. For example, in another embodiment a light source, such as an LED, is mounted to a printed circuit board and assembled within the first end of a marking device. A corresponding light housing includes features for providing electrical power to the light source. As such, when the first end of the marking device is inserted into a light housing an electrical connection is made and the light source is illuminated within the barrel. The light source is configured to illuminate in the desired color or a filter may be employed. In such an embodiment, electrical connections are provided at the first end of the marking device to engage mating connections in the light housing. The connections on the marking device are provided via an electrically conductive plastic or metal leads.

In another embodiment, a light source and a first induction coil are assembled within the first end of the marking device. A second induction coil is disposed in the light housing. As such, when the first end of the marking device is inserted into the light housing and power is supplied to the second induction coil, the first and second induction coils inductively couple. This coupling generates a voltage in the first induction coil by a process known in the art that is sufficient to provide electrical power to illuminate the light source.

In a further embodiment, a printed circuit board is disposed in the first end of the marking device. The printed circuit board includes three resistors and associated electrical contacts for each of the resistors located on an exterior surface of the marking device. The light housing includes mating electrical connections for each of the three resistors' connections and a tri-color light source. The tri-color light source may be an LED (or multiple LEDs) that emits red, green, and blue light. Each resistor is paired with a light color. The resistance of each of the resistors is selected to vary the amount of electrical current flowing through the light source for each color. Thereby, the intensity of light emitted in each of the three colors is controlled. Thus, the overall color of the light emitted by the light source is tailored to mimic the developed color of the ink contained in the marking device.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. An illuminated marking device comprising:
   a marker including a transparent or translucent barrel, a colorless marking material stored within the barrel, a marking tip at a first end of the marker, and an endpiece at a second end of the marker, the endpiece including a lens that is tinted in a color similar to a developed color of the marking material;
   a base including a power source and a plurality of apertures configured to accept at least one of the marker; and
   a light housing in electrical communication with the power source and including a light source and an aperture configured to removeably couple to the second end of the marker,
   wherein the second end of the marker is removeably coupled to the aperture of the light housing, and wherein light from the light source is filtered by the lens and illuminates the barrel of the marker in the color similar to the developed color of the marking material,
   wherein the light housing includes one or more of a switch and a sensor disposed within an interior of the light housing, the one or more of the switch and the sensor being actuated by insertion of the second end of the marker into the interior of the light housing to illuminate the light source.

2. The illuminated marking device of claim 1, wherein the lens comprises a colored plug.

3. The illuminated marking device of claim 2, wherein the plug includes a recess configured to at least partially accept the light source therein.

4. The illuminated marking device of claim 1, wherein the switch aids coupling the second end of the marker within the interior of the light housing.

5. The illuminated marking device of claim 1, further comprising:
a timer that automatically turns off the light source after a pre-determined duration of continuous illumination of the light source.

6. The illuminated marking device of claim 1, wherein the base further comprises:
a retaining rod configured to removeably couple with the light housing.

7. The illuminated marking device of claim 6, wherein the retaining rod includes one or more of a flange, rib, and protuberance configured to couple with a mating feature of the light housing.

8. The illuminated marking device of claim 1, wherein marker is a felt tip marker.

9. The illuminated marking device of claim 1, further comprising:
a marking surface having a developer material disposed thereon that develops the colorless marking material to provide a colored appearance when the colorless marking material is transferred to the marking surface.

10. An apparatus for illuminating a marking device, the apparatus comprising:
a marker including a transparent or translucent barrel, a colorless marking material housed within the barrel, a marking tip at a first end of the marker, and an endpiece at a second end of the marker, the endpiece including a lens that is tinted in a color similar to a developed color of the marking material;
a light housing including a light source and an aperture configured to removeably couple to the second end of the marker;
a base including a plurality of apertures configured to accept an equal plurality of the marker, a retaining rod configured to removeably couple with the light housing, and a power source; and
a wire coupled between the power source in the base and the light source in the light housing,
wherein the second end of the marker is removeably coupled to the aperture of the light housing and wherein light from the light source is filtered by the lens and illuminates the barrel of the marker in the color similar to the developed color of the marking material.

11. The illuminated marking apparatus of claim 10, further comprising:
a marking surface having a developer material disposed thereon that develops the colorless marking material to provide a colored appearance when the colorless marking material is transferred to the marking surface.

12. The illuminated marking apparatus of claim 10, wherein the lens comprises a colored plug.

13. The illuminated marking apparatus of claim 12, wherein the plug includes a recess configured to at least partially accept the light source therein.

14. The illuminated marking apparatus of claim 10, wherein the light housing includes one of a switch and a sensor disposed within an interior of the light housing, the one or more of the switch and the sensor being actuated by insertion of the second end of the marker into the interior of the light housing to illuminate the light source, and wherein the switch aids coupling the second end of the marker within the interior of the light housing.

15. The illuminated marking apparatus of claim 12, further comprising:
a timer that automatically turns off the light source after a pre-determined duration of continuous illumination of the light source.

16. A kit for creating artwork with an illuminated marking device, the kit comprising:
a plurality of markers, each marker of the plurality of markers including
a transparent or translucent barrel,
a colorless marking material housed within the barrel,
a marking tip at a first end of the marker,
a cap configured to removeably couple to the first end of the marker, and
an endpiece at a second end of the marker, the endpiece including a lens that is tinted in a color similar to a developed color of the marking material, wherein the marking material in each of the plurality of markers provides a different developed color;
a light housing including a light source, an aperture configured to removeably couple to the second end of the marker, and a switch configured to trigger illumination of the light source;
a timer that automatically turns off the light source after a pre-determined duration of continuous illumination of the light source;
a base including a plurality of apertures configured to accept the plurality of markers, a retaining rod configured to removeably couple with the light housing, and a power source;
an electrical cord coupled between the power source in the base and the light source in the light housing; and
a marking surface having a developer material disposed thereon that develops the colorless marking material to provide a colored appearance when the colorless marking material is transferred to the marking surface,
wherein the second end of the marker is removeably coupled in the aperture of the light housing, and wherein light from the light source is filtered by the lens and illuminates the barrel of the marker in the color similar to the developed color of the marking material.

17. The kit of claim 16, wherein the switch aids removeably coupling the second end of the marker within the interior of the light housing.

* * * * *